(12) United States Patent  
Delong et al.

(10) Patent No.: US 9,097,210 B2
(45) Date of Patent: Aug. 4, 2015

(54) TURBINE GENERATOR ASSEMBLY FOR THRUST VECTOR CONTROL

(75) Inventors: Zachary J. Delong, Roscoe, IL (US); Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 537 days.

(21) Appl. No.: 13/541,585

(22) Filed: Jul. 3, 2012

(65) Prior Publication Data

US 2014/0007555 A1    Jan. 9, 2014

(51) Int. Cl.
| | |
|---|---|
| *F02K 1/00* | (2006.01) |
| *F02K 9/80* | (2006.01) |
| *F02K 1/76* | (2006.01) |
| *F16H 47/06* | (2006.01) |
| *H02K 7/116* | (2006.01) |
| *F16H 47/02* | (2006.01) |
| *F16H 48/30* | (2012.01) |

(52) U.S. Cl.
CPC . *F02K 1/76* (2013.01); *F02K 1/002* (2013.01); *F02K 9/80* (2013.01); *F02K 9/805* (2013.01); *F16H 47/02* (2013.01); *F16H 47/06* (2013.01); *F16H 48/30* (2013.01); *H02K 7/116* (2013.01)

(58) Field of Classification Search
CPC .......................................................... F16H 1/22
USPC .......... 60/39.08, 204, 228, 230, 232; 244/3.1, 244/164, 171.1, 171.2; 475/149, 150; 74/730.1, 731.1, 732.1, 733.1
See application file for complete search history.

(56) References Cited

U.S. PATENT DOCUMENTS

| | | | | |
|---|---|---|---|---|
| 2,004,019 | A * | 6/1935 | Swetenham | 60/352 |
| 2,357,041 | A * | 8/1944 | Woolley | 60/39.182 |
| 2,432,358 | A * | 12/1947 | Warner | 74/665 GA |
| 2,659,529 | A * | 11/1953 | Price | 415/177 |
| 2,822,667 | A * | 2/1958 | Drexel | 60/39.48 |
| 2,856,175 | A * | 10/1958 | Martz, Jr. | 137/49 |
| 2,865,227 | A * | 12/1958 | Kelley et al. | 477/53 |
| 2,922,429 | A * | 1/1960 | Whitaker | 415/17 |
| 3,052,252 | A * | 9/1962 | Laucks et al. | 415/17 |
| 3,145,532 | A * | 8/1964 | Moss | 60/788 |
| 3,180,088 | A * | 4/1965 | Swain | 60/39.25 |
| 3,769,790 | A * | 11/1973 | Thebert | 60/39.08 |
| 4,899,850 | A * | 2/1990 | Koller et al. | 184/6.3 |
| 2006/0042262 | A1 * | 3/2006 | Ganev et al. | 60/773 |

FOREIGN PATENT DOCUMENTS

EP        2354008 A1 *  8/2011   ............... B64G 1/40

* cited by examiner

*Primary Examiner* — Phutthiwat Wongwian
*Assistant Examiner* — Rene Ford
(74) *Attorney, Agent, or Firm* — Kinney & Lange, P.A.

(57) ABSTRACT

A system and method includes a thrust system; a generator for providing electric power to at least one electromechanical actuator of the thrust system; a turbine for driving the generator; a speed control valve for metering propellant to the turbine; and a gear assembly for connecting the turbine, the generator, and the speed control valve.

15 Claims, 4 Drawing Sheets

TURBINE GENERATOR ASSEMBLY FOR THRUST VECTOR CONTROL

BACKGROUND

The present invention is related to thrust actuation, and in particular to a system and method for providing electromechanical power to thrust actuators of space launch vehicles.

Thrust vector control is the ability of a vehicle, such as a space launch vehicle, to control the direction of thrust from its engines in order to control its flight path or angular velocity. This is typically done through the use of actuators. The actuators control the deflection of a nozzle, which in turn adjusts the thrust vector of the space launch vehicle.

Traditionally, space launch vehicle thrust vector control has been powered by hydraulic systems. Hydraulic power was generated by turbine pump assemblies that used pressurized gas to spin a turbine which drove a hydraulic pump. These hydraulic systems are becoming obsolete as vehicles move toward all-electric systems.

Powering electric systems for space launch vehicles has been accomplished using battery technologies. However, due to the limitations of current battery technologies with regard to weight, volume, cost, and reliability, there is a need to develop a more affordable and power/energy dense electric power source.

SUMMARY

A system includes a thrust system, a generator, a turbine, a speed control valve, and a gear assembly. The generator provides electric power to at least one electromechanical actuator of the thrust system. The turbine drives the generator. The speed control valve meters propellant to the turbine, and the gear assembly connects the turbine, the generator, and the speed control valve.

DETAILED DESCRIPTION

The present invention is a turbine generator system whereby the generator supplies electric power to electromechanical thrust vectoring actuators of a rocket engine on a space launch vehicle. In particular, a small fraction (approximately 0.1%) of liquid hydrogen fuel is diverted from the main fuel line of the rocket engine, and evaporated. The resulting gas is received by a turbine, and serves as a high-pressure working fluid that drives the turbine. This turbine in turn drives a generator which provides electric power to electromechanical actuators. These electromechanical actuators adjust the deflection of a nozzle, thereby controlling the rocket thrust vector. The speed of the turbine is controlled by a speed control valve. The speed control valve meters propellant to the turbine and is mechanically governed based upon the operating speed of the turbine.

Figure 1:
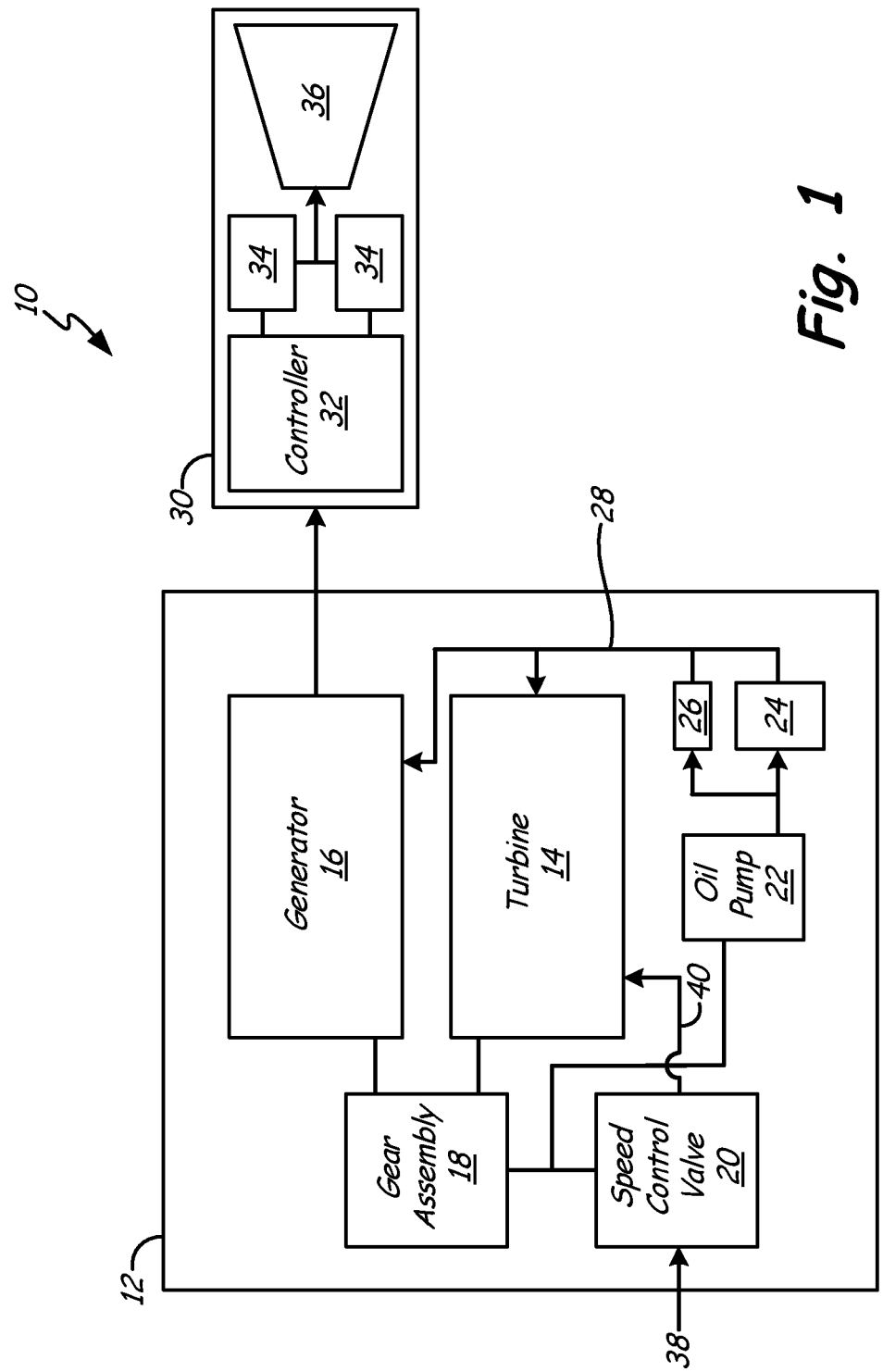
FIG. 1 is a block diagram illustrating a system for providing thrust to a space launch vehicle according to an embodiment of the present invention.

FIG. 1 is a block diagram illustrating a system 10 for powering a thrust system of a space launch vehicle according to an embodiment of the present invention. System 10 includes turbine generator assembly 12, (which includes turbine 14, generator 16, gear assembly 18, speed control valve 20, lube oil pump 22, lube oil filter 24, lube oil bypass valve 26, and cooling circuit 28), thrust system 30, (which includes controller 32, thrust vectoring actuators 34, and nozzle 36), propellant inlet 38, and metered propellant path 40. Turbine 14 is any turbine known in the art such as, for example, a single stage, multiple nozzle impulse turbine. Generator 16 is any electric generator known in the art.

Liquid fuel, such as hydrogen fuel, is burned with an oxidizer to create a high pressure gas in a rocket engine. Some of this gas is diverted from the main fuel line of the rocket engine and provided to speed control valve 20 through propellant inlet 38. Speed control valve 20 regulates the amount of gas provided to spin turbine 14. Turbine 14 powers generator 16 through gear assembly 18. Generator 16 generates electric power and provides electric power to thrust system 24. Thrust system 24 utilizes the electric power provided by generator 16 to power controller 32 and thrust vectoring actuators 34. Thrust vectoring actuators 34 may be implemented as, for example, two conventional, motor-driven linear electromechanical actuators oriented on normal axes (approximately 100 horsepower for each actuator). Controller 32 is any microcontroller such as, for example, a field programmable gate array (FPGA). Thrust vectoring actuators 34 adjust the deflection of nozzle 36, thereby controlling the rocket thrust vector.

Lube oil pump 22 is a standard lube oil pump known in the art and is contained in a reservoir housing. Oil pump 22 provides lubrication and cooling to both turbine 14 and generator 16 through cooling circuit 28. Oil is first passed through filter 24. The oil then exits gear assembly 18, travels through cooling circuit 28, and then re-enters gear assembly 18. Filter bypass valve 26 allows oil to bypass filter 24 if filter 24 is clogged. This is accomplished by measuring the oil pressure at filter bypass valve 24. For example, if the pressure at filter bypass valve 24 is greater than a maximum value, such as 300 pounds per square inch (PSI), unfiltered oil bypasses filter 24 to turbine 14 so as not to starve turbine 14 of oil. A separate valve may set the oil pressure in cooling circuit 28 to, for example, 65 PSI downstream of filter 24.

Figure 2:
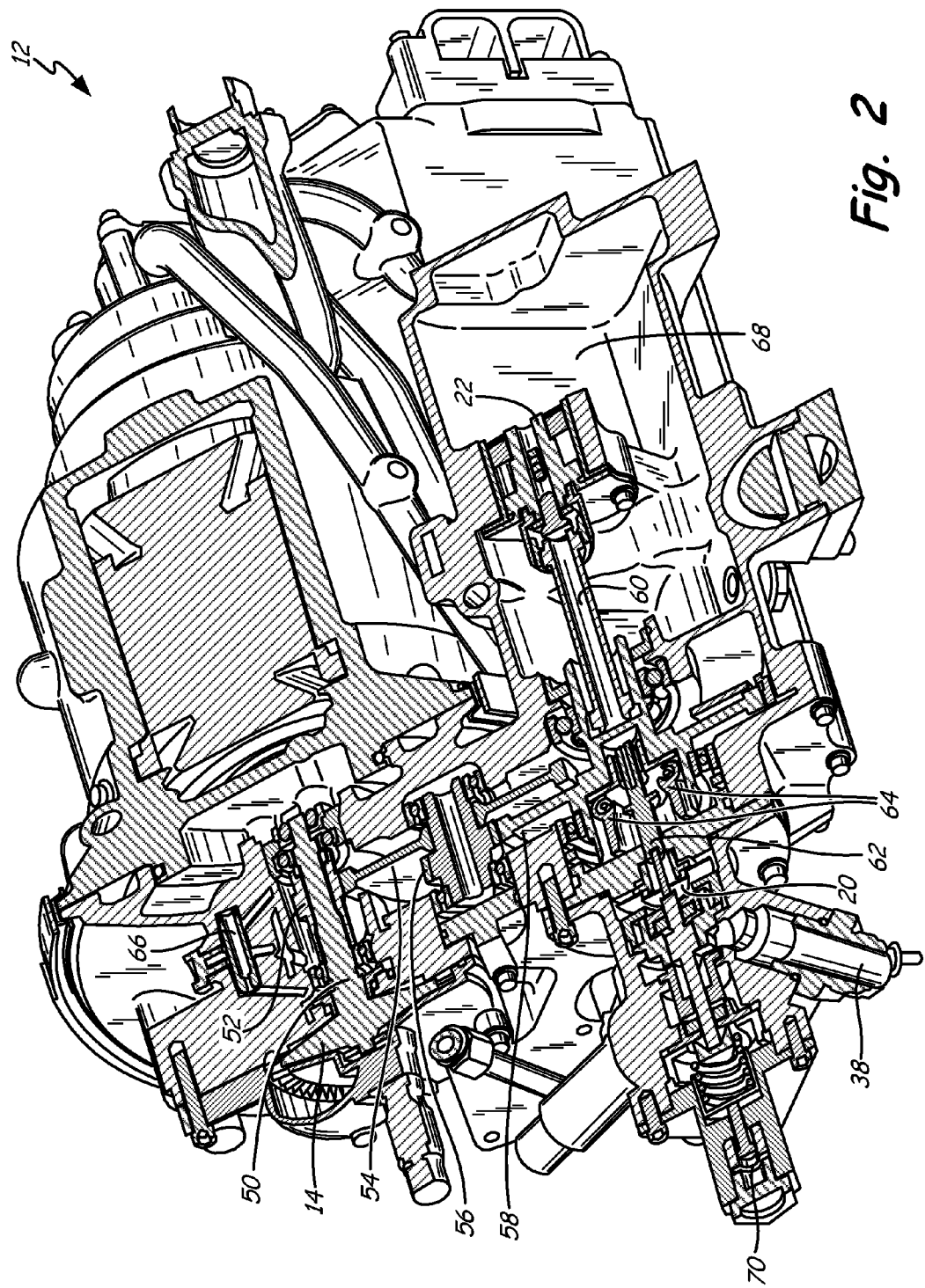
FIG. 2 is a schematic cross section of a turbine generator assembly for providing electric power to an electromechanical thrust vector control system of a thrust system of a space launch vehicle according to an embodiment of the present invention.

FIG. 2 is a schematic cross section of a turbine generator assembly 12 for providing to an electromechanical thrust vector control system of thrust system 30 (FIG. 1) of a space launch vehicle according to an embodiment of the present invention. Assembly 12 includes turbine 14, turbine shaft 50, spur gear 52, intermediate gears 54 and 56, output gear 58, spline shaft 60, speed control valve 20, poppet 62, governor flyweights 64, lube oil pump 22, lube oil restricting manifold 66, oil reservoir 68, propellant inlet 38, and speed adjustment screw 70.

Speed control valve 20 mechanically meters propellant to turbine 14 to control the speed of turbine generator assembly 12. Liquid fuel, such as liquid hydrogen, is diverted from the main fuel line of the rocket engine. This propellant is received by speed control valve 20 from propellant inlet 38. The metered propellant is provided to turbine 14 through metered propellant path 40. Turbine 14 receives this propellant and powers spur gear 52. Spur gear 52 drives intermediate gears 54 and 56. Intermediate gear 56 drives a larger diameter output gear 58. Output gear 58 spins governor flyweights 64. Flyweights 64, due to centrifugal force, are driven radially outward, which axially drives poppet 62 based upon the rotational speed of output gear 58. Poppet 62 governs speed control valve 20, and in turn, the amount of propellant provided to turbine 14. Speed adjustment screw 70 is adjusted to control the operating speed of turbine 14 by preloading a spring to control governor flyweights 64. Output gear 48 also drives spline shaft 60 to control lube oil pump 22.

Lube oil restricting manifold 66 is upstream of turbine 14. Manifold 66 drops the pressure of the oil provided to turbine 14 from lube oil pump 22. The pressure is dropped from, for example, 65 PSI to 10 PSI. This is to ensure that turbine bearings are not provided with too much oil. Losses can occur, and excess heat can be generated if too much oil is provided to the turbine bearings.

Figure 3:
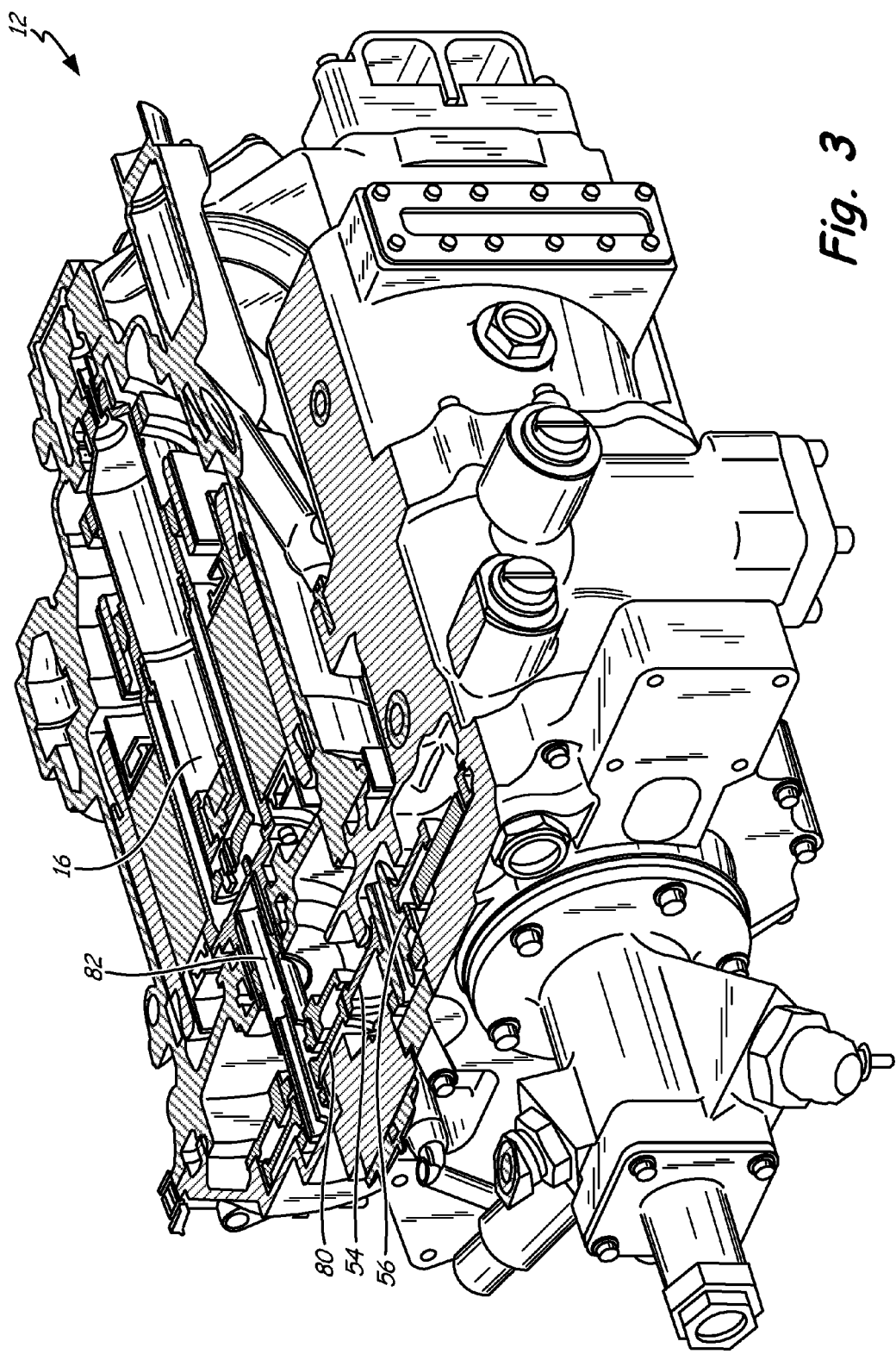
FIG. 3 is a schematic cross section showing a gear system along with a generator according to an embodiment of the present invention.

FIG. 3 is a schematic cross section showing gear assembly 18 along with generator 16 according to an embodiment of the present invention. Intermediate gear 54 drives generator output gear 80. Generator output gear in turn spins generator output shaft 82. Output shaft 82 turns generator 16. Generator 16 produces electric energy that is provided to thrust system 30. FIG. 3 also displays metered propellant path 40.

Figure 4:
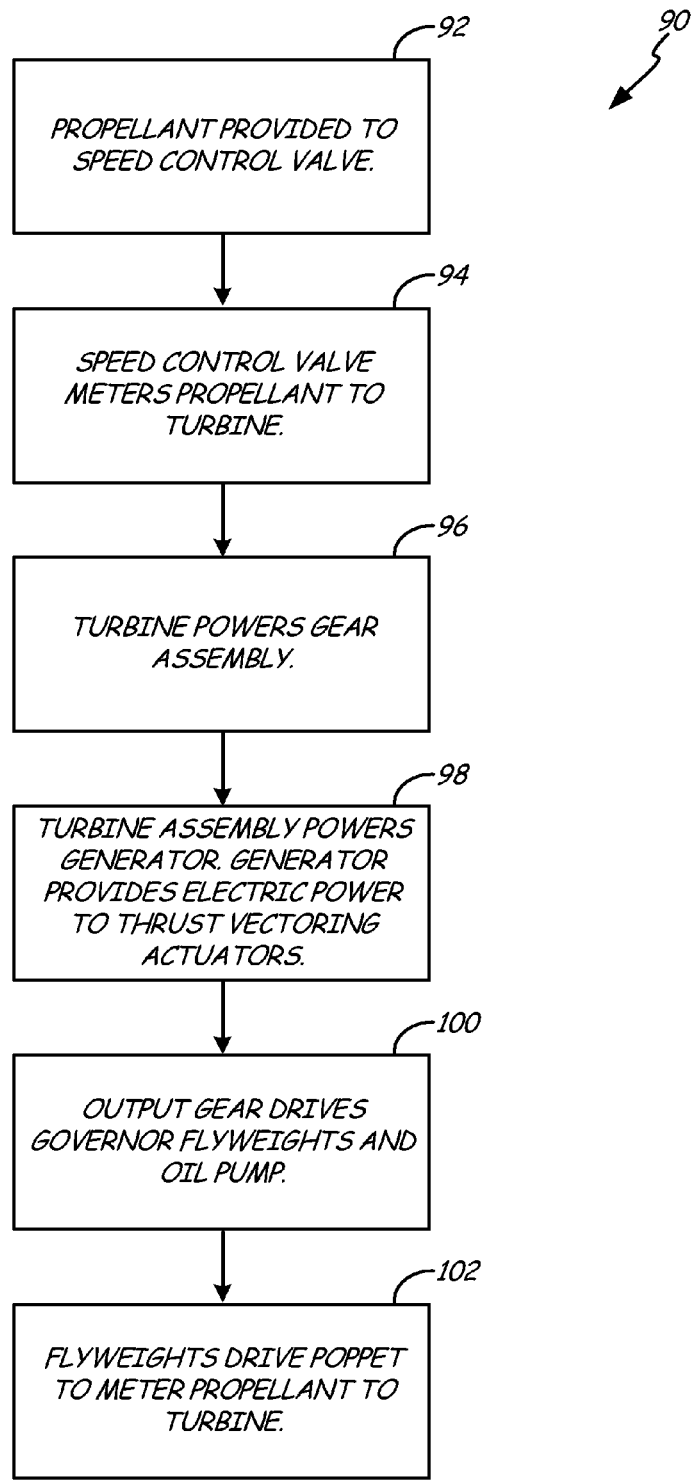
FIG. 4 is a flowchart illustrating a method of providing electric power to an electromechanical thrust vector control system of a thrust system of a space launch vehicle according to an embodiment of the present invention.

FIG. 4 is a flowchart illustrating a method 90 for providing thrust vectoring control to a space launch vehicle according to an embodiment of the present invention. At step 92, gaseous fuel is provided to speed control valve 20 from the main fuel line of the rocket. At step 94, speed control valve 20 meters propellant to turn turbine 14. At step 96, turbine 14 powers spur gear 52, which turns three intermediate gears 54, 56 and 80. At step 98, intermediate gear 80 turns generator 16 to generate electric power that is used by controller 32 and electromechanical thrust vector actuators 34 to control the thrust vector of nozzle 36. At step 100, intermediate gear 54 turns output gear 58 which drives governor flyweights 64, and turns spline shaft 60 to power lube oil pump 22. At step 102, flyweights 64 drive poppet 62 to meter propellant to turbine 14.

In this way, the present invention describes a system and method for providing electromechanical power to thrust actuators of space launch vehicles. Although the present invention has been described with reference to preferred embodiments, workers skilled in the art will recognize that changes may be made in form and detail without departing from the spirit and scope of the invention.

The invention claimed is:

1. A system comprising:
   a thrust system that includes at least one electromechanical actuator for controlling a thrust vector of the thrust system;
   a generator for providing electric power to the at least one electromechanical actuator of the thrust system;
   a turbine for driving the generator;
   a speed control valve for metering propellant to the turbine; and
   a gear assembly for connecting the turbine, the generator, and the speed control valve, wherein the gear assembly comprises:
      a spur gear engaged to the turbine;
      a first intermediate gear engaged with the spur gear;
      a second intermediate gear engaged with the first intermediate gear and the generator;
      a third intermediate gear engaged with the first intermediate gear; and
      an output gear engaged to the third intermediate gear and the speed control valve.

2. The system of claim 1, wherein the output gear is also engaged to turn a spline shaft, wherein the spline shaft powers a lube oil pump for providing lubrication and cooling to the turbine and generator.

3. The system of claim 1, wherein the speed control valve comprises:
   a poppet for metering propellant to the turbine; and
   one or more governor flyweights for driving the poppet.

4. The system of claim 1, further comprising a lube oil pump for providing lubrication and cooling to the turbine and the generator.

5. The system of claim 1, further comprising a lube oil restricting manifold for regulating oil provided to the turbine.

6. The system of claim 1, wherein the propellant is liquid hydrogen fuel.

7. A method for providing thrust to a space launch vehicle, the method comprising:
   providing propellant to a turbine through a speed control valve;
   powering a spur gear using the turbine, wherein the spur gear is engaged to the turbine;
   powering a first intermediate gear using the spur gear, wherein the first intermediate gear is engaged to the spur gear;
   powering second and third intermediate gears using the first intermediate gear, wherein the second and third intermediate gears are engaged with the first intermediate gear;
   powering a speed control output gear using the third intermediate gear, wherein the speed control output gear is engaged to the third intermediate gear;
   powering a generator using the second intermediate gear, wherein the generator provides electric power to a thrust system;
   powering the speed control valve using the speed control output gear; and
   electromechanically controlling a thrust vector of the thrust system.

8. The method of claim 7, providing propellant through a speed control valve comprises:
   driving a poppet using one or more governor flyweights; and
   metering propellant to the turbine using the poppet.

9. The method of claim 7, further comprising providing lubrication and cooling to the turbine and generator using a lube oil pump.

10. The method of claim 9, further comprising regulating oil to the turbine using a lube oil restricting manifold.

11. A turbine generator assembly, the system comprising:
   a generator for providing electric power to a thrust vector control system;
   a turbine for driving the generator;
   a speed control valve for controlling propellant to the turbine; and
   a gear assembly for connecting the turbine, the generator, and the speed control valve, wherein the gear assembly comprises:
      a spur gear engaged to the turbine;
      a first intermediate gear engaged with the spur gear;
      a second intermediate gear engaged with the first intermediate gear and the generator;
      a third intermediate gear engaged with the first intermediate gear; and
      an output gear engaged to the third intermediate gear and the speed control valve.

12. The assembly of claim 11, wherein the speed control valve comprises:

a poppet for metering propellant to the turbine; and
one or more governor flyweights for driving the poppet.

13. The assembly of claim 11, further comprising a lube oil pump for providing lubrication and cooling to the turbine and the generator.

14. The assembly of claim 11, further comprising a lube oil restricting manifold for regulating oil provided to the turbine.

15. The assembly of claim 11, wherein the propellant is liquid hydrogen fuel.

* * * * *